United States Patent [19]
Nelson

[11] 3,970,488
[45] July 20, 1976

[54] METHOD AND APPARATUS FOR MOLDING SPLICES IN CABLES

[75] Inventor: Arthur L. Nelson, La Jolla, Calif.

[73] Assignee: Townsend and Townsend, San Francisco, Calif.

[22] Filed: Mar. 7, 1975

[21] Appl. No.: 556,519

[52] U.S. Cl. .................................. 156/49; 249/95; 425/108
[51] Int. Cl.² ........................................ B21F 15/02
[58] Field of Search ...................... 156/48, 49, 500; 425/108, 812, 116, 121, 127; 264/275, 277; 249/94, 95, 93; 174/76; 285/21, 22, 294

[56] References Cited
UNITED STATES PATENTS

| | | | |
|---|---|---|---|
| 2,563,829 | 8/1951 | Fitzgerald et al. | 156/49 X |
| 2,716,623 | 8/1955 | Tator | 249/95 X |
| 3,754,845 | 8/1973 | Rauscher et al. | 425/812 X |
| 3,880,557 | 4/1975 | Nelson | 425/108 |

Primary Examiner—David A. Simmons
Attorney, Agent, or Firm—Townsend and Townsend

[57] ABSTRACT

A molded cable splice is formed by wrapping strip-formed semiconducting and insulative thermosetting molding compounds about a layer of semiconducting tape covering a connector and exposed central conductors of a pair of cable ends joined by the connector, and bonding the insulative molding compound to the cable insulation layer in a heated mold having opposing end clamp portions each with an inner surface of a predetermined radius and length. The radius is selected in accordance with the formula $$R = \sqrt{\frac{2rX}{\pi} + r^2}$$

where $r$ is the radius of the cables to be joined and $X$ is a numerical quantity called the cable clamp factor. For cables having an ethylene propylene rubber insulation layer, $X$ lies in the range from about 0.20 to about 0.50; for cables with a cross-linked polyethylene insulation layer, $X$ is partially dependent on insulation thickness $W$ and lies between a lower range of from about 0.50 to about 0.76 for $W = 0.175$ inch and an upper range of from about 0.87 to about 1.00 for $W = 0.900$ inch. The axial length of the end clamp portions optimally lies in the range from about 2.5 to about 3.5 inches. The end clamp portions may also be tapered in the outward direction, with the taper angle preferably in the range from 2° to 4°, and the radius at substantially the mid-point between the inner and outer boundary of each end clamp portion selected in accordance with the above formula.

13 Claims, 8 Drawing Figures

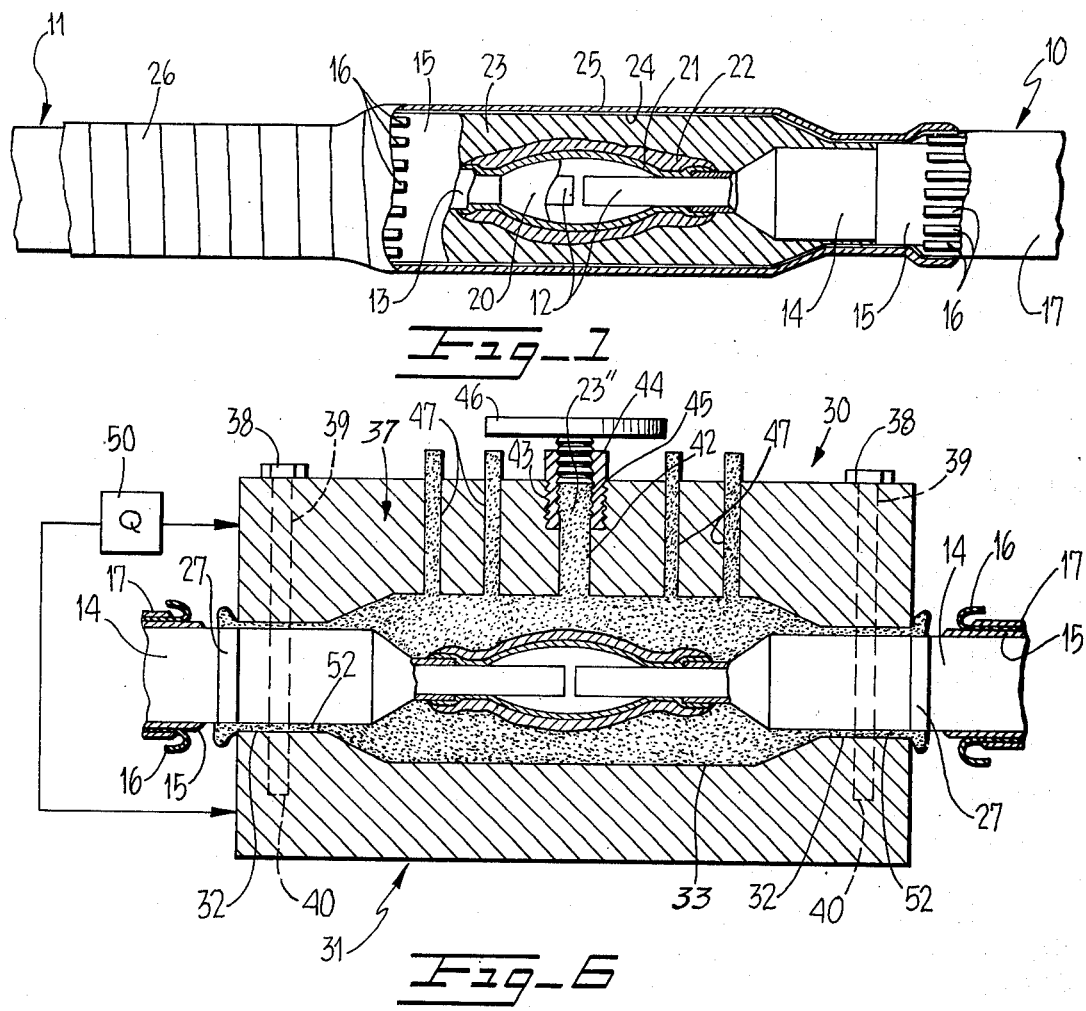
Fig. 1
Fig. 6
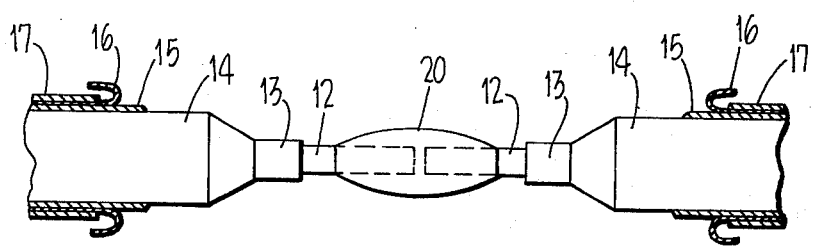
Fig. 2

METHOD AND APPARATUS FOR MOLDING SPLICES IN CABLES

BACKGROUND OF THE INVENTION

This invention relates to the field of electrical cable splicing. More particularly, this invention relates to techniques for providing insulated splices for high voltage cables and the like.

High voltage cables used to transmit large quantities of electrical power either above ground or underground frequently require splicing either during installation or during repair. The following commonly assigned pending U.S. patent applications disclose several techniques used for splicing cables:

| | |
|---|---|
| Serial No. 334,103 filed Feb. 20, 1973 for | "MOLDING APPARATUS FOR SPLICING ELECTRICAL CABLE" |
| Serial No. 541,298 filed Jan. 15, 1975 for | "CABLE MOLDING APPARATUS AND METHOD" |
| Serial No. 545,948 filed Jan. 31, 1975 for | "MOLDING METHOD FOR SPLICING ELECTRICAL CABLE" |

Typically, in making a splice the ends of the two cables to be spliced together are first prepared by removing a portion of the outer cable jacket, folding back the electrically conductive outer metallic shield, removing a portion of the underlying outer semiconducting screen, penciling the cable insulation down to the inner semiconducting screen, and removing a portion of the inner semiconducting screen to expose the central conductors. The two exposed central conductor end portions are next mechanically and electrically coupled together by means of a conventional connector, e.g., a connector sold in the trade as a CADWELD connector. The splice is next covered with one or more layers of semiconducting tape, and an electrically insulative jacket is molded onto the splice and adjacent regions of the cable insulation, after which a layer of semiconducting material is applied to the outer surface of the insulative mold, a layer of metal gauze material is wrapped around the semiconductive material, secured in place and soldered to the electrically conductive outer metallic shield and the splice is finished off with a layer of conventional electrician's tape.

The insulative jacket is molded to the cable splice by wrapping strips of semiconducting molding compound over the semiconducting tape, wrapping strips of electrically insulative thermosetting molding compound over the wrapped semiconducting molding material, placing the wrapped splice into a mold cavity having end clamp portions at opposed ends, closing and heating the mold cavity to soften the wrapped layers while supplying additional insulative molding compound under heat and pressure into the mold chamber to soften the semiconducting and insulative molding compounds and bond them to the various surfaces with which they make contact, and curing the molded splice. Since both the molding compound and the cable insulation material typically possess a high coefficient of thermal expansion, the end clamp portions are provided with an inner radius larger than the outer radius of the cable insulation in order to permit softened compound and material to egress from the mold cavity during the molding process.

Cable splices prepared in the above fashion have been found to function well in many applications. However, in some cases, internal mold pressure during the heat-molding process increases to a value at which cable deformation, and in severe cases, cable rupture, occurs. In other cases, the internal mold pressure during the heat-molding process does not attain a value sufficient to properly cure the splice or to avoid undesirable gas entrainment in the splice. Efforts to provide a low cost method and apparatus capable of ensuring suitable mold pressures have not met with wide success to data.

SUMMARY OF THE INVENTION

The invention comprises a method and apparatus for providing an insulative molded splice for high voltage cables, the splice having a proper bond between the insulative molding compound and the cable insulation. The apparatus includes a molding chamber having a central mold cavity and opposed end clamp portions, the latter each having an inner surface with a radius of a magnitude lying in a predetermined narrow range, which is dependent upon the external radius, insulation thickness and insulation composition of the cables to be spliced. The radius of the end clamp portions of the mold $$R = \sqrt{\frac{2rX}{\pi} + r^2}$$

where $r$ is the external radius of the cable to be molded and $X$ is a numerical quantity designated as the cable clamp factor. For cables having an ethylene propylene rubber insulation layer, X lies in the range from about 0.20 to about 0.50. For cables having a cross-linked polyethylene insulation layer, X is partially dependent on insulation thickness W and lies between a lower range of from about 0.50 to about 0.76 for a minumum thickness W of 0.175 inch and an upper range of from about 0.87 to about 1.00 for a maximum thickness W of 0.900 inch. In an alternate embodiment, each end clamp portion is tapered outwardly and the radius of the inner surface thereof at substantially the midpoint between the inner and outer boundaries thereof is selected in accordance with the formula supra. The taper angle is selected to lie in the range from about 2° to about 4°.

When a cable to be spliced is placed in a mold having end clamp portions with a radius as given above and an optimal axial length of about 2.5 to about 3.5 inches, an annular space is provided between the outer surface of the cable insulation and the inner surface of the end clamp portion of the mold which enables heated insulative molding compound to flow there through to the exterior of the mold at an optimum rate which permits a proper bond to be formed with the exposed surface of the cable insulation.

According to the method, a cable prepared in the manner noted above is placed in the lower half of a mold having end clamp portions with a radius as given above, and the mold is closed and heated. Additional insulative molding compound is forced into the central mold cavity, preferably by means of a feedscrew apparatus, and a portion of the melted insulative molding compound exudes through the annular clearance space at each end clamp portion externally of the mold and solidifies. After the insulative molding compound is cured to form a bond with the insulation layer of the cable ends, the mold is opened and the cable is removed. The cable splice is finished in the conventional manner noted above.

For a fuller understanding of the nature and advantages of the invention, reference should be had to the ensuing detailed description taken in conjunction with the accompanying drawings.

BRIEF DESCRIPTION OF THE DRAWINGS

FIG. 1 is a front elevational view, partially in section, of a cable splice prepared in accordance with the invention;

FIG. 2 is a side elevational view of two cable ends with a connector attached;

FIG. 8 is a schematic partial sectional view of an alternate mold having tapered end clamp portions.

DESCRIPTION OF THE PREFERRED EMBODIMENT

Figure 3:
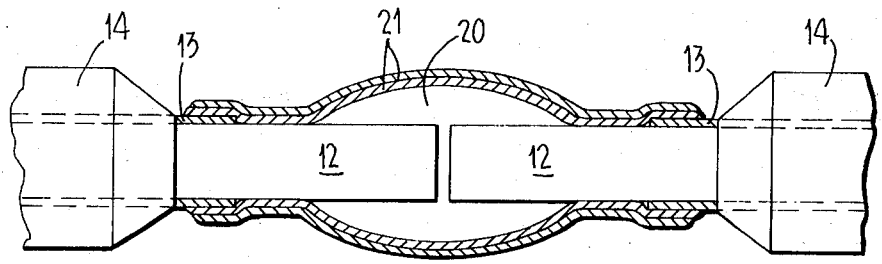
FIG. 3 and 4 are side sectional views illustrating successive stages in formation of the cable splice.

Turning now to the drawings, FIG. 1 shows a cable splice prepared in accordance with the teachings of the invention. As seen in this FIG., a pair of high voltage cable ends 10, 11 are joined together in a splice. Each cable has a central conductor portion 12 comprising a plurality of strands of metal wire, an inner semiconducting sheath 13, an insulation layer 14, an outer semiconducting sheath 15, an outer ground shield comprising a plurality of longitudinally extending electrically conductive metal strips 16, and an outer insulative sheath 17. The central conductors 12 are joined together mechanically and electrically by means of a conventional connector 20, preferably a connector sold under the trade name CADWELD. Surrounding the convector 20 and the inner semiconducting layers 13 are a plurality of layers of semiconducting tape, preferably HOTSPLICER nylon semiconducting tape No. 209, designated by reference numeral 21.

Surrounding the semiconducting tape 21 is a molded layer 22 of semiconducting molding compound, preferably HOTSPLICER No. 201 semiconducting molding compound. Surrounding layer 22 is a molded layer 23 of electrically insulative molding compound, preferably HOTSPLICER No. 111 ethelyne propylene rubber (EPR) insulation molding compound which is a thermosetting material. Surrounding layer 23 is a layer of semiconducting material 24, preferably HOTSPLICER semiconducting paint No. 604, which overlaps outer semiconducting layers 15. Surrounding layer 24 is a sheath of metal gauze 25 which is soldered at opposite ends to conductive metal strips 16 of cable ends 10, 11. A layer of electrically insulative tape 26, e.g., conventional vinyl electrician's tape, overlies outer jackets 17, cables 10, 11 and metal gauze sheath 25.

All products designated above with the trademark HOTSPLICER are commercially available from Hexcel Corporation — Electrical Products Department of San Diego, California. Suitable equivalents will occur to those skilled in the art.

To insure proper functioning of the spliced high voltage cables, a proper bond must be formed between insulative molded layer 23 and the exposed surfaces of insulation layers 14 of cable ends 10, 11. In order to create such a bond, the splice is prepared according to the invention in the following manner:

With reference to FIG. 2, the cable ends 10, 11 are prepared in a substantially identical fashion by removing a portion of outer jacket 17, peeling back conducting members 16, removing a portion of outer semiconducting layer 15 and tapering the ends thereof as shown. An end portion of insulation layer 14 is next removed and tapered as shown, a process known in the art as penciling, to expose inner semiconducting layer 13, after which a portion of layer 13 is removed to expose the central conductors 12. A CADWELD, or equivalent, connector 20 is next installed on the exposed central conductors 12 to mechanically and electrically fasten these elements together.

With reference to FIG. 3, two half lapped layers of semiconducting tape 21 are next wrapped about connector 20 and a major portion of the exposed inner semiconducting layers 13. Preferably, a small clearance on the order of about ⅛ should be provided between the opposing ends of the layer of tape 21 and the ends of the cable insulation 14.

Figure 4:
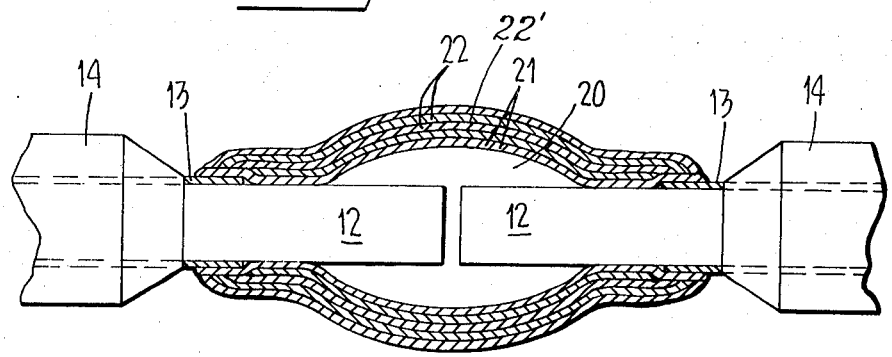

With reference to FIG. 4, a plurality of butt-lapped layers of semiconducting molding compound 22 supplied in strip form are next wrapped about the layers 21 of semiconducting tape, with the uppermost layer 22' completely covering the ends of the semiconducting tape 21.

Figure 5:
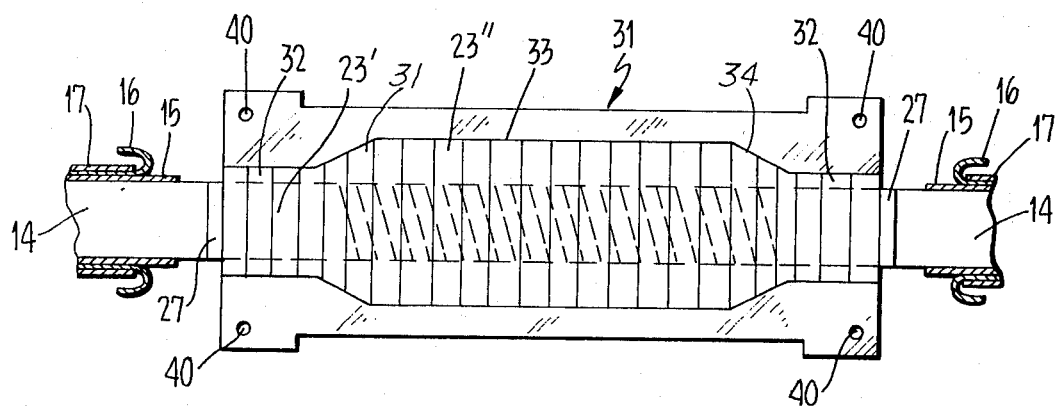
FIG. 5 is a top plan view of a wrapped cable splice placed in a lower mold half portion prior to molding.

With reference to FIG. 5, a small strip of marker tape 27 is next arranged circumferentially of the insulation layer 14 of each cable end 10, 11 at a distance from the center of connector 20 which is one-half the length of a mold 30, the bottom portion 31 of which is illustrated in this FIG. A plurality of spiral butt-wrapped layers 23' of insulative molding compound supplied in strip form are next wrapped about insulation layers 14 of the two cable ends 10, 11 and about layers 22 between the two marker tapes 27. The number of layers 23' of insulative molding compound required depends upon the outer diameter of the cable insulation layer 14 and the radius of the end clamp portions 32 of the mold 30, and the diameter of wrapped layers 23' should be equal to twice the radius of end clamp portions 32 of mold 30. This dimension can be readily measured by an outside caliper. Preferably, each layer 23' ends either at the top or the bottom of the mold 30 and not at the mold parting line. A plurality of second layers 23'' of insulative molding compound are next spiral-butt wrapped about the central portions of first layers 23' until layers 23'' are substantially equal to the diameter of the central mold cavity 33 with tapered ends 34 as depicted in FIG. 5.

Figure 6:
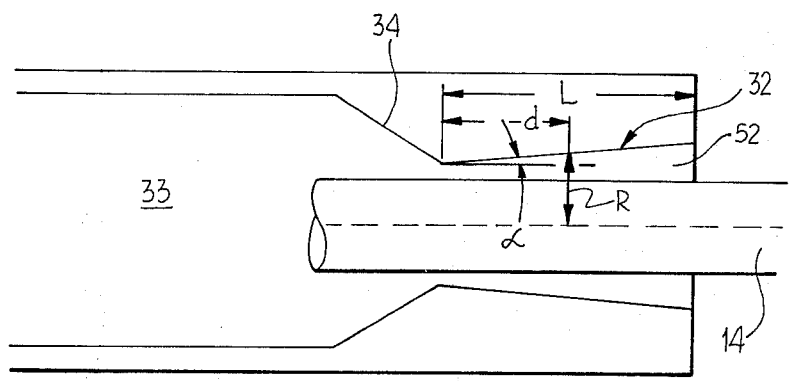
FIG. 6 is a longitudinal sectional view showing the cable splice in the mold.

With reference to FIGS. 5 and 6, the top half portion 37 of mold 30 is next secured to the bottom half portion 31 by any suitable means, such as bolts 38 which extend through passages 39 shown in phantom in FIG.

6 and are threaded into tapped bores 40 in lower portion 31 of mold 30.

Top half portion 37 of mold 30 is provided with a feed channel 42 having an enlarged threaded upper portion 43 for receiving the externally threaded lower end of an insulative molding compound feedpot 44. Feedpot 44 has a central volume 45 in communication with channel 42 for receiving additional insulative molding compound 23''' and an internally threaded bore into which the lower end of a manually operable feedscrew 46 is received. A plurality of bleed sprue bores 47 permit egress of excess softened molding compound 23''' to the exterior of mold 30 as noted more fully below.

A suitable source of heat schematically depicted at 50 is thermally coupled to mold 30 in order to heat thermosetting insulative molding compound layers 23', 23'' and molding compound 23''' in the feedpot 44 to the softened or pliable state, and feedscrew 46 is manipulated to advance the lower end thereof into chamber 45, thereby forcing additional insulative molding compound into the mold cavity 33, upwardly through the bleed sprue bores 47 and outwardly via an annular clearance space 52 between the inner surface of end clamp portions 32 and the outer surface of cable insulation layers 14. With the compounds specified above, feedscrew 46 is advanced in feedpot 44 until about three inches of insulative molding compound have exuded outwardly of bleed sprue bores 47 with a mold temperature of about 250°F. It is noted that during this process, a small quantity of softened insulative molding compound 23 egresses via clearance spaces 52 externally of the mold 30. After the specified quantity of insulative compound 23 has exuded outwardly of bleed sprue bores 47, mold 30 is heated to 275°F and the bleed sprue bores 47 are covered by any suitable means (not shown). The mold is next heated to a curing temperature of about 390°F and cured in a conventional manner known to those skilled in the art.

After the splice has been cured, heat source 50 is thermally disconnected from mold 30 and the mold is permitted to cool to about 150°F. Bolts 38 and feedpot 44 are then removed and top half portion 37 of mold 30 is raised while forcing the now solidified insulative molding compound comprising layer 23 downwardly in bleed sprue bores 47 and chamber 42 until top half portion 37 is clear of the molded splice. Excess insulative molding compound comprising layer 23 is next removed from the ends of the now-cured splice and the ends are taper-sanded back to a point approximately one-half inch from the end of mold 30, with the ends tapering as shown in FIG. 1. The vertically extending bleed sprue and feedpot portions of layer 23 are next trimmed to the surface, and the surface of layer 23 is sanded and covered with a smooth coat of semiconducting paint. This layer should preferably overlap outer semiconducting layer 15 by about one-half inch.

The splice is finished in a conventional manner by wrapping metal gauze layer 25 about the molded splice and outer semiconducting layers 15, soldering the ends of metal gauze layer 25 to the conductive metal strips 16, and applying a finishing layer of vinyl tape.

Figure 7:
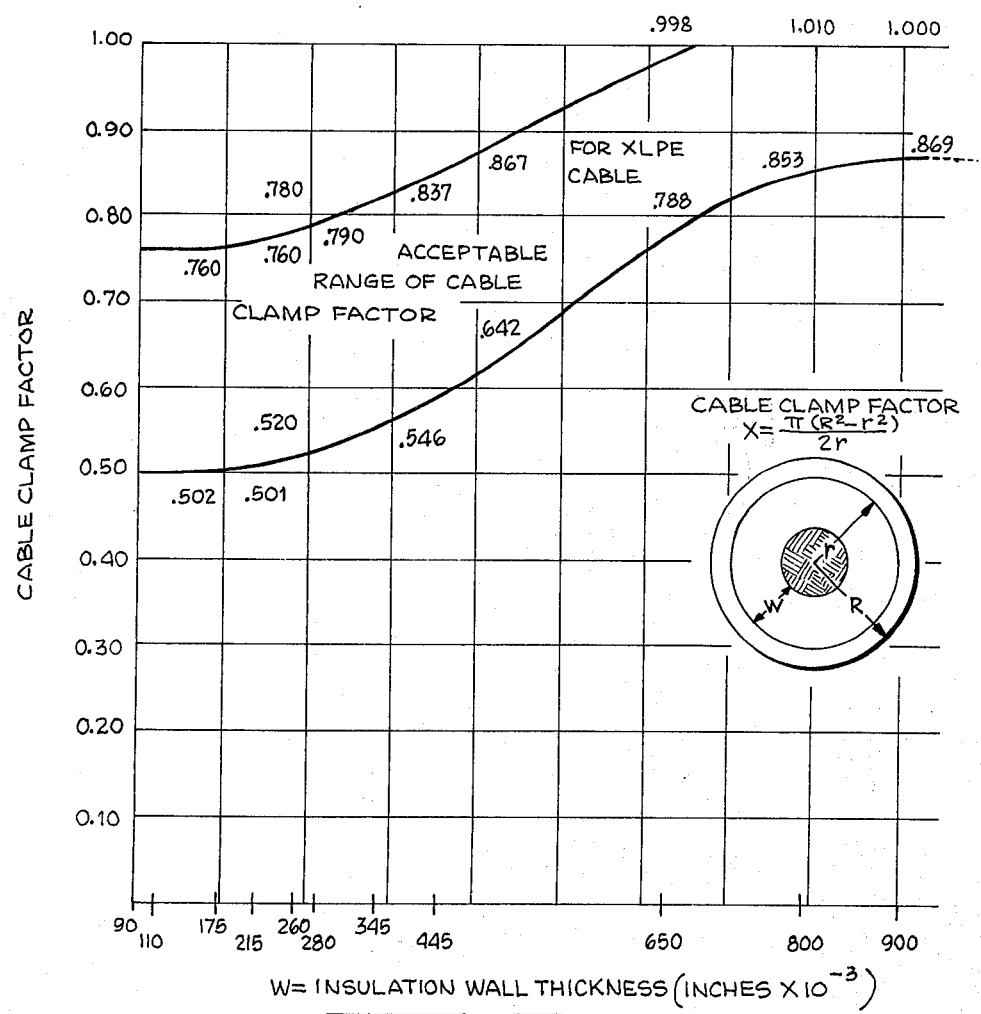
FIG. 7 is a graph illustrating the variation of cable clamp factor X with thickness of the cable insulation for cables having cross-linked polyurethane insulation.

To ensure a high quality bond between insulative molding compound layer 23 and the exposed surfaces of cable insulation layers 14, the radius of the mold clamp portions 32 must be preselected in accordance with the equation $$R = \sqrt{\frac{2rX}{\pi} + r^2}$$

where $r$ is the outer radius of the cable and $X$ is the cable clamp factor. For cables having an insulation layer 14 of ethylene propylene rubber, the optimum range for cable clamp factor $X$ is from about 0.20 to about 0.50 irrespective of the thickness of insulation layer 14. However, for cables having an insulation layer 14 of cross-linked polyethylene (XLPE) the range of permissible values for the cable clamp factor $X$ is dependent upon the thickness $W$ of insulation layer 14. With reference to FIG. 7, which is a graph of cable clamp factor $X$ versus insulation 14 wall thickness $W$, the permissible range on $X$ lies from about 0.50 to about 0.76 for cables having a minimum thickness $W$ of about 0.175 inch to from about 0.870 to about 1.0 for cables having a maximum thickness $W$ of 0.900 inch. It has been found that by choosing a radius $R$ in accordance with the formula noted above using a value of $X$ in the specified ranges, a fault-free bond is invariably obtained between layer 23 and the cable insulation layer 14. Optimum results have been obtained with molds having end clamp portions 32 with an axial length lying in the range from about 2.5 to about 3.5 inches.

FIG. 8 is a partial schematic view of the right end of a mold, as viewed in FIG. 6, showing an alternate embodiment of the invention. In the FIG. 8 embodiment, end clamp portion 32 has a tapered wall surface which tapers outwardly. The taper angle $\alpha$, defined as the angle between the end clamp portion 32 wall surface and a line parallel to the axis of the mold, preferably lies in the range from about 2.0° to about 4.0°, and the radius R at substantially the midpoint $d$ of the length L of end clamp portion 32 is selected in accordance with the formula stated supra.

Cable splices prepared in accordance with the teachings of the invention have been found to exhibit an excellent bond between the critical interface of the insulative compound layer and the cable insulation layer. In addition, such cable splices are regularly free of deformations, cable rupture and gas entrainments. As a result, such cable splices have been found to function in a superior fashion to those prepared in accordance with known, conventional techniques.

While the above provides a full and complete disclosure of the preferred embodiments of the invention, various modifications, alternate constructions and equivalents may be employed without departing from the true spirit and scope of the invention. For example, if desired mold 30 may be designed with paired sets of removable end clamp portions 32, with each pair having a radius of a different magnitude from the remaining pairs so that cables of different radii $r$ may all be spliced in a single mold. Therefore, the above description and illustrations should not be construed as limiting the scope of the invention which is defined by the appended claims.

What is claimed is:

1. A method for forming a cable splice between two cable ends of a pair of cables having a radius $r$, said cables including an electrically conductive central core and a surrounding layer of electrically insulative material having a radial thickness W, said method comprising the steps of:

a. removing portion of said electrically insulative material from each of said cable ends to expose said electrically conductive central core;
b. joining the ends of said central cores to form a joint;
c. surrounding said joint and a portion of said insulative material with an insulative molding compound;
d. placing the surrounded joint in a mold having a central cavity and a pair of opposing end clamp portions, each end clamp portion having an inner surface with a radius $$R = \sqrt{\frac{2rX}{\pi} + r^2}$$

where $X$ is a numerical quantity lying in the range from about 0.20 to about 1.00; and e. applying heat to said mold to soften said insulative molding compound so that a molded splice is formed about said joint.

2. The method of claim 1 wherein said electrically insulative layer of said cable comprises ethylene propylene rubber and X lies in the range from about 0.20 to about 0.50.

3. The method of claim 1 wherein said electrically insulative layer of said cables comprises cross-lined polyethylene, W lies in the range from about 0.175 to about 0.900 inch, and X lies between a lower range of from about 0.50 to about 0.76 and an upper range from about 0.85 to about 1.00.

4. The method of claim 1 wherein said step (a) of removing includes the step (i) of tapering said electrically insulative material inwardly in the direction of the cable splice.

5. The method of claim 1 further including the step of (g) finishing said cable splice by covering said molded splice with an outer sheath.

6. The method of claim 1 wherein said end clamp portions are provided with an axial length in the range from about 2.5 to about 3.5 inches.

7. The method of claim 1 wherein said inner surface of each of said end clamp portions is tapered outwardly and said radius R is the radius of said surface at substantially the midpoint along the length of said end clamp portion.

8. The method of claim 7 wherin each of said inner surfaces has a constant taper angle $\alpha$ in the range from about 2.0 to about 4.0 degrees.

9. The method of claim 1 further including the step of (f) curing said splice.

10. In a mold for use in forming a cable splice between two cable ends of a pair of cables of a type associated with said mold, each said cable having a predetermined radius r, said cables including an electrically conductive core and a surrounding layer of electrically insulative material having a radial thickness W, said mold comprising first and second mating portions having opposing wall surfaces forming an enlarged central cavity and a pair of opposing end clamp regions each with an inner surface of radius R when said mating portions are mated, means for supplying an insulative molding compound to said central cavity, and means for heating said mold, the improvement wherein the radius R of the inner surface of each of said end clamp regions is dimensioned in accordance with the relationship $$R = \sqrt{\frac{2rX}{\pi} + r^2}$$

where $X$ is a numerical quantity lying in the range from about 0.20 to about 1.00.

11. The combination of claim 10 wherein X lies in the range from about 0.20 to about 0.50.

12. The combination of claim 10 wherein X lies between a lower range from about 0.50 to about 0.70 and an upper range from about 0.85 to about 1.00 for cables having a radial thickness W lying in the range from about 0.175 to about 0.900 inch.

13. The combination of claim 10 wherein said end clamp regions have an axial length lying in the range from about 2.5 to about 3.5 inches.

* * * * *